C. CRANDALL.
SKID-ATTACHMENT FOR WAGONS.
No. 191,570. Patented June 5, 1877.
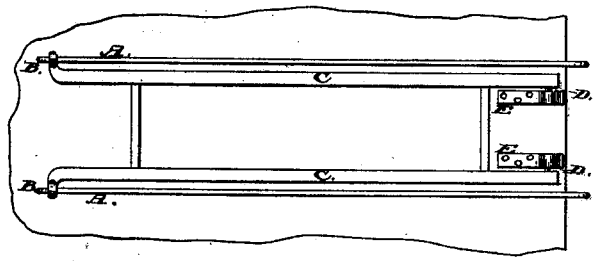
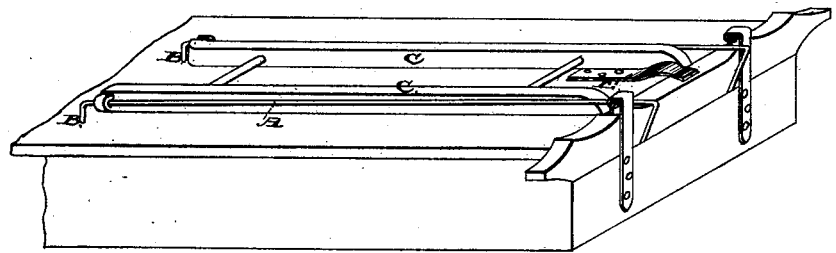
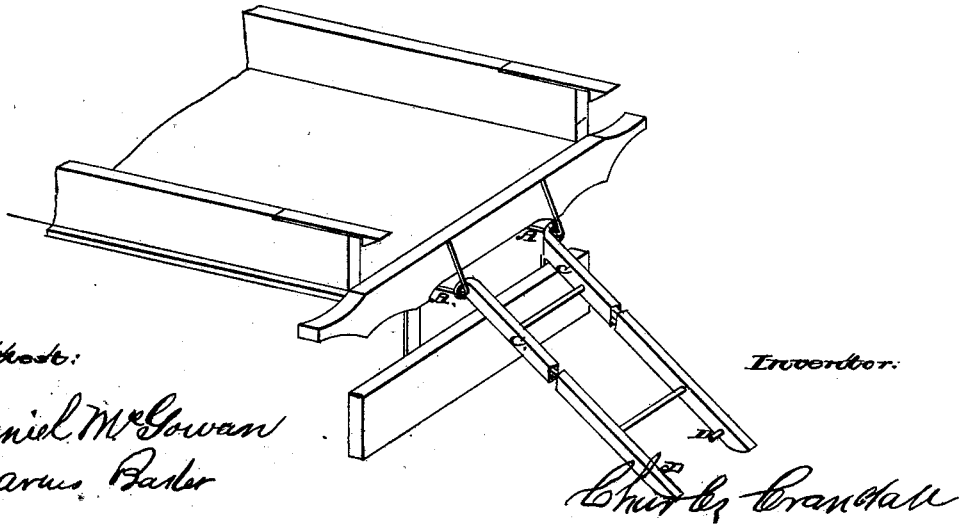

UNITED STATES PATENT OFFICE.

CHARLES CRANDALL, OF NEWPORT, RHODE ISLAND.

IMPROVEMENT IN SKID ATTACHMENTS FOR WAGONS.

Specification forming part of Letters Patent No. 191,570, dated June 5, 1877; application filed April 6, 1877.

*To all whom it may concern:*

Be it known that I, CHARLES CRANDALL, of Newport, in the county of Newport and State of Rhode Island, have invented a new and Improved Skid Attachment for Vehicles; and I do hereby declare the following to be a full, clear, and exact description thereof, reference being had to the accompanying drawings, and to the letters of reference marked thereon, which form a part of this specification, and in which—

Figure 1 is a bottom-plan view of my invention, and Figs. 2 and 3 perspective views of the same.

Similar letters of reference occurring on the several figures indicate corresponding parts.

My invention has for its object to permanently attach a skid to the under side or bottom of a wagon-body or other vehicle, in such a manner as to permit of the skid being readily drawn out when required for use in unloading the vehicle, and pushed back under the body out of the way when not required; and it consists in the details of construction and general arrangement of parts, all as will be hereinafter more fully described, and pointed out in the claim.

Referring to the drawings, C C represent the two side bars of the skid, each being provided at the forward end with suitable rings or hooks, adapted to embrace and slide upon the metallic rods or bars A A, secured to the under side or bottom of the vehicle-body, said bars A being bent at an angle, B, at each end, to allow of their projecting downward sufficiently to allow of the easy working of the skid. To the rear of the skid are provided projecting pins D D, which, when the skid is pushed back under the vehicle-body, catch under the springs E at the rear of the vehicle, to hold the skid in its place upon the side bars A, and to prevent its sliding out when the wagon is in motion or going up an incline.

It will be observed that, by means of my improved construction, the skid is at all times securely connected to the under side of the vehicle-body, out of the way when not required for use, and adapted to be readily drawn out for unloading or loading the vehicle when necessary.

It will also be observed that my invention is capable of being readily attached to the bottom of any ordinary car or wagon body without necessitating any change or alteration in the bottoms of the same. The pins D, catching under the rounded springs E at the rear of the vehicle, serve to securely hold the skid in place under the body of the vehicle when not required for use. So, also, by pressing down upon the springs E, the pins D are released therefrom, thus allowing of the easy withdrawal of the skid.

I do not desire to claim, broadly, the side bars or rods A, as I am aware that a similar construction is shown in the patent granted to H. Bailey under date of February 17, 1874; but What I do claim as new and useful is—

The combination of the skid C C, having projecting pins D D at the rear, with the springs E E and bars A upon the under side of the vehicle-body, substantially as and for the purpose described.

CHARLES CRANDALL.

Witnesses:
 DANIEL McGOWAN,
 DARIUS BAKER.